(12) United States Patent
Bourbiaux et al.

(10) Patent No.: US 8,688,424 B2
(45) Date of Patent: Apr. 1, 2014

(54) METHOD OF MODELLING A POROUS GEOLOGIC MEDIUM TRAVERSED BY A NETWORK OF FRACTURES

(75) Inventors: Bernard Bourbiaux, Rueil Malmaison (FR); Philippe Delaplace, Rueil Malmaison (FR); André Fourno, Rueil Malmaison (FR)

(73) Assignee: IFP, Rueil-Malmaison Cedex (FR)

( * ) Notice: Subject to any disclaimer, the term of this patent is extended or adjusted under 35 U.S.C. 154(b) by 917 days.

(21) Appl. No.: 12/738,109

(22) PCT Filed: Nov. 6, 2008

(86) PCT No.: PCT/FR2008/001567
§ 371 (c)(1),
(2), (4) Date: Jul. 9, 2010

(87) PCT Pub. No.: WO2009/098366
PCT Pub. Date: Aug. 13, 2009

(65) Prior Publication Data
US 2010/0274547 A1  Oct. 28, 2010

(30) Foreign Application Priority Data
Nov. 19, 2007  (FR) .................................... 07 08154

(51) Int. Cl.
*G06G 7/48* (2006.01)
*G06G 7/50* (2006.01)
*G06F 19/00* (2011.01)

(52) U.S. Cl.
USPC ................................ 703/10; 703/9; 702/100

(58) Field of Classification Search
USPC .................... 703/9, 10; 702/12, 50, 100, 179; 166/250.1, 259
See application file for complete search history.

(56) References Cited

U.S. PATENT DOCUMENTS

| 6,064,944 A | 5/2000 | Sarda et al. |
| 6,662,109 B2 * | 12/2003 | Roggero et al. ................. 702/6 |
| 2002/0016702 A1 | 2/2002 | Manceau et al. |

FOREIGN PATENT DOCUMENTS

| EP | 1 158 312 A1 | 11/2001 |
| FR | 2 757 957 | 7/1998 |

OTHER PUBLICATIONS

Gaoming Li (History dependent modeling of counter-current flow in porous medium, pp. 1-188, May 2003).*
Warren, J.E.: "The Behavior of Naturally Fractured Reservoirs", 19630901, No. 426, Sep. 1, 1963, XP002039628, pp. 245-255.

(Continued)

*Primary Examiner* — Kamini S Shah
*Assistant Examiner* — Andre Pierre Louis
(74) *Attorney, Agent, or Firm* — Antonelli, Terry, Stout & Kraus, LLP.

(57) ABSTRACT

A method of modelling a fractured reservoir having application for petroleum reservoir development is disclosed utilizing a set of several families of equivalent blocks of regular shapes and sizes. The fractured reservoir is modelled by a complex porous medium made up of irregular blocks. A function defining the progress of an imbibition front within these blocks, whose derivative A'(X) is calculated, is determined. A function defining the progress of an imbibition front within regular equivalent blocks, whose derivative A'eq(X) is calculated, is then determined. This derivative, which constitutes at least two line segments with distinct slopes, depends on the dimensions of the equivalent blocks. Finally, the dimensions of the equivalent blocks are obtained by adjusting the two derivatives A'eq(X) and A'(X).

2 Claims, 2 Drawing Sheets

(56) References Cited

OTHER PUBLICATIONS

Famy C., et al: "Accurate Modeling of Matrix-Fracture Transfers in Dual-Porosity Models: Optimal Subgridding of Matrix Blocks", SPE Reservoir Simul. Symp. Proc.; SPE Reservoir Simulation Symposium, Proceedings; 2005 SPE Reservoir Simulation Symposium, Proceedings 2005, 2005, pp. 257-267, XP002487219.

* cited by examiner

METHOD OF MODELLING A POROUS GEOLOGIC MEDIUM TRAVERSED BY A NETWORK OF FRACTURES

CROSS-REFERENCE OT RELATED APPLICATION

This application claims priority of French Application Serial No. 07/-8.154, filed Nov. 19, 2007, and PCT/FR2008/001567, filed Nov. 6, 2008 (published as WO 2009/098366 on Aug. 13, 2009).

BACKGROUND OF THE INVENTION

1. Field of the Invention

The present invention relates to optimization of the development of underground reservoirs such as hydrocarbon reservoirs, notably those comprising a network of fractures.

2. Description of the Prior Art

The petroleum industry, and more precisely petroleum reservoir exploration and development, requires knowledge of the underground geology as perfectly as possible to efficiently provide evaluation of reserves, production modelling or development management. In fact, determining the location of a production well or of an injection well, the drilling mud composition, the completion characteristics, the parameters required for optimum hydrocarbon recovery (such as injection pressure, production flow rate, etc.) requires good knowledge of the reservoir. Reservoir knowledge notably means knowledge of the petrophysical properties of the subsoil at any point in space.

The petroleum industry has therefore combined for a long time field (in-situ) measurements with experimental modelling (performed in the laboratory) and/or numerical modelling (using softwares). Petroleum reservoir modelling thus is a technical stage that is essential for any reservoir exploration or development procedure. The goal of modelling is to provide a description of the reservoir.

Fractured reservoirs are an extreme type of heterogeneous reservoirs comprising two very different media, a matrix medium containing the major part of the oil in place and having a low permeability, and a fractured medium representing less than 1% of the oil in place and highly conductive. The fractured medium itself can be complex, with different sets of fractures characterized by their respective density, length, orientation, inclination and opening.

Engineers in charge of the development of fractured reservoirs need to know as perfectly as possible the role of fractures. What is referred to as fracture is a plane discontinuity of very small thickness in relation to the extent thereof, representing a fracture plane of rock of the reservoir.

On the one hand, knowledge of the distribution and of the behavior of fractures allows optimization of the location and the spacing between wells to be drilled through the oil-bearing reservoir.

On the other hand, the geometry of the fracture network conditions and the fluid displacement at the reservoir scale as well as the local scale where it determines elementary matrix blocks in which the oil is trapped. Knowing the distribution of the fractures is therefore also very helpful, at a later stage, to reservoir engineers who want to calibrate the models which are constructed to simulate the reservoirs in order to reproduce or to predict the past or future production curves.

Geoscience specialists therefore have three-dimensional images of reservoirs allowing location of a large number of fractures.

However, in order to predict fluid flows which are likely to occur through the reservoir and thus to simulate the production of hydrocarbons according to various production scenarios, software is used which referred to as a "flow simulator" which allows carrying out reservoir simulations, that is simulations of flow within the reservoir. Flow simulators are based on numerical schemes that do not allow three-dimensional images of fracture networks to be directly used. The representation of a fracture network in flow simulators has long been considered as unrealistic because the network configuration is partly unknown, and because of the numerical limitations linked with the juxtaposition of many cells having very different dimensions and properties.

Simplified but realistic modelling of such media therefore is of great relevance to reservoir specialists.

There is a well-known approach, referred to as the "double porosity approach", as described for example by Warren J. E. et al. in "The Behavior of Naturally Fractured Reservoirs", SPE Journal (September 1963), 245-255. This technique allows interpretation of the double porosity (or double medium) behavior of a fractured reservoir from a single-phase flow well test. According to this approach, any elementary volume (cell) of the fractured reservoir is modelled in a form of a set of identical parallelepipedic blocks referred to as equivalent blocks. These blocks are limited by an orthogonal system of continuous uniform fractures oriented along the main directions of flow. The flow of the fluids, at the reservoir scale, occurs through the fractures only, and fluid exchanges take place locally between the fractures and the matrix blocks.

It is however necessary to calculate the dimensions of the equivalent parallelepipedic blocks. Finally, French Patent 2,757,957 and counterpart U.S. Pat. No. 6,064,944, describe a method for determining the equivalent block dimensions. This method allows defining a single equivalent block of rectangular section for each layer of the reservoir. Now, the geological reality is often complex, to such an extent that the representation of the fractures by a single equivalent block is often too imprecise to allow the matrix/fracture exchanges to be estimated with sufficient precision.

SUMMARY OF THE INVENTION

The invention thus is an alternative method for optimizing the development of a fluid reservoir traversed by a network of fractures, from modelling of the reservoir as a porous medium comprising a set of blocks of irregular shapes and sizes defined by fractures. In this method, a simplified representation of the medium is determined as a set of equivalent blocks of regular shapes and sizes, the simplified representation substantially leading to the same fluid recovery during a capillary imbibition process of the porous medium. The method comprises the following stages:

determining a first curve representing the derivative (A'(X)) of a function (A(X)) defining a progress of an imbibition front within the constituent blocks of the porous medium, with respect to a distance of progress (X) of the front;

determining a second curve representing the derivative (A'eq(X)), with respect to the distance of progress (X), of a function (Aeq(X)) defining a progress of an imbibition front within the constituent equivalent blocks of the simplified representation, the second curve including at least two line segments with distinct slopes and depending on the dimensions of the equivalent blocks;

obtaining the dimensions of the equivalent blocks by adjusting the second curve (A'eq(X)) to the first curve (A'(X)); and optimizing the development of the reservoir by simulating fluid flows in the reservoir, by use of a double-medium reservoir simulator using the dimensions of families of equivalent blocks.

According to an embodiment, only two families of parallelepipedic equivalent blocks are identified. The dimensions of these blocks comprise the dimensions a1 and b1 of the base of the blocks of a first family, the dimensions a2 and b2 of the base of the blocks of a second family, as well as surface proportions of the blocks of these two families. These dimensions of equivalent blocks can then be determined by the following stages:

evaluating a1 by minimizing a sum of mean square deviations between the derived curves;

calculating an ordinate difference between the two line segments for an abscissa equal to a1/2;

determining slopes of two segments defined in respective intervals [0; a1/2] and [a1/2; a2/2], and as an ordinate at an origin of one of the segments; and determining dimensions b1, a2 and b2, and surface proportions, from an ordinate difference, the slopes and the ordinate at origin.

The method according to the invention is notably suited for the study of hydraulic properties of fractured formations including the study of hydrocarbon displacements in underground reservoirs. In particular, the invention relates to a method for modelling the network of fractures of a heterogeneous geologic medium for predicting fluid flows likely to occur through the medium. It is then possible to simulate hydrocarbon production according to various production scenarios.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

Figure 1:
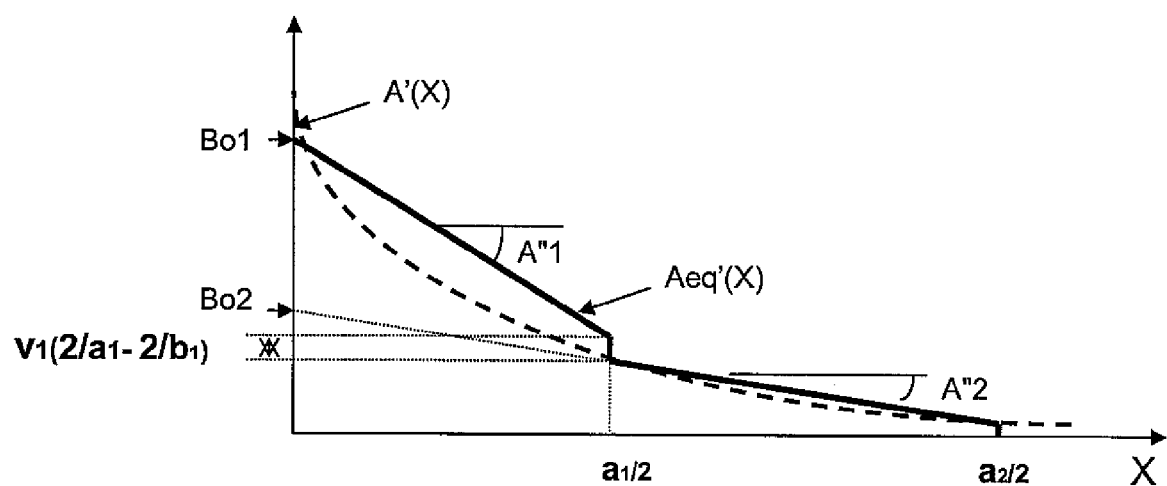
FIG. 1 illustrates the principle of the method of the invention for determining two families of equivalent blocks.

The method according to the invention allows optimization of the development of a hydrocarbon reservoir, notably when the reservoir comprises a network of fractures. In particular, the method allows modeling of the reservoir as a simplified porous medium referred to as the "equivalent medium". What is referred to as equivalent medium is a medium whose oil recovery estimation during a displacement process, such as a capillary imbibition, is substantially the same as the oil recovery estimation made on the complex porous medium, that is representative of the various shapes and dimensions of the matrix blocks making up the reservoir which is considered.

More precisely, a starting point is from a geologic model of the reservoir being studied which has a detailed representation of its real inner complexity. This model constitutes a complex porous medium made up of a set of porous matrix blocks of irregular shapes and sizes. Each one of the blocks is defined by fractures. The oil recovery during a capillary imbibition process is estimated from this complex porous medium. The geometry of a simplified porous medium having the same petrophysical properties and behaving in an equivalent manner in terms of oil recovery is then determined. This equivalent medium has one or more sets of blocks referred to as the equivalent blocks, identical in dimension and shape. It can be, for example, families of parallelepipeds. The method comprises four stages:

1—Discretization of the reservoir into a set of cells
2—Modelling the fracture network
3—Simulation of the fluid flows
4—Optimization of the reservoir production conditions.

1—Discretization of the Reservoir into a Set of Cells

The petroleum industry has combined long time field (in-situ) measurements with experimental modelling (performed in the laboratory) and/or numerical modelling (using softwares).

Petroleum reservoir modelling thus is a technical stage that is essential for any reservoir exploration or development procedure. The goal of such modelling is to provide a description of the reservoir characterized by the structure/geometry and the petrophysical properties of the geologic formations or its constituent deposits.

These modellings are based on a representation of the reservoir as a set of cells. Each cell represents a given volume of the reservoir and it constitutes an elementary volume of the reservoir. The cells as a whole make up a discrete representation of the reservoir.

2—Modelling the Fracture Network

To take into account the part of the fracture network in the simulation of flows within the reservoir, it is necessary to associate with each elementary volume (cell) a modelling of the fractures.

The starting point is from a geologic model of the reservoir being studied, which is a detailed representation of its real inner complexity. This model constitutes a complex porous medium made up of a set of porous matrix blocks, of irregular shapes and sizes, defined by fractures. This complex porous medium constitutes a representative image of the real fracture network.

Figure 2:
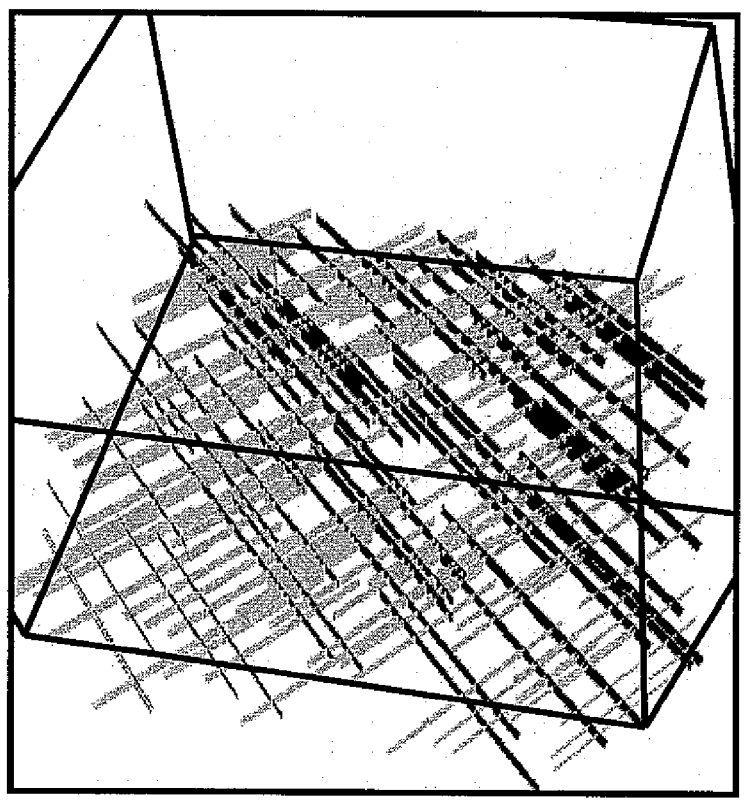
FIG. 2 is an example of an image representing a realistic fracture network having two fracture families, FIG. 3 compares, for the network image of FIG. 2, function Aeq(X) relative to a family of equivalent blocks with the real function A(X)

Such an image can be generated by well-known modelling softwares, such as the FRACAFlow® software (IFP, France). Such an image is shown in FIG. 2.

This complex representation is then simplified by a simplified porous medium, equivalent in terms of oil recovery.

The double-porosity approach is therefore applied, which is associated with a method of determining N families of equivalent blocks. The method determines the dimensions of the sections of the equivalent blocks in the plane of the geological layers, by identifying a function representing the invaded area of the blocks, denoted by A, as a function of the distance of penetration, denoted by X, of a front from the limit of the blocks to the center thereof. It comprises the following stages:

determining the curve representing the area of the block invaded by a displacing fluid, as a function of the distance of penetration of the water front in a block;

determining the derivative of this curve with respect to the distance of penetration; and determining dimensions of the block of at least two families of equivalent blocks by adjusting to the derived curve A'(X) an equivalent derived curve A'eq(X).

Determination of A(X)

During production of the hydrocarbons of a reservoir, a displacing fluid such as water circulates within the reservoir. According to the reservoir modelling as a complex porous medium comprising a set of blocks, the water circulates in the fractures and enters the matrix blocks where its progression can by first approximation be related to that of a water-oil front. The distance between the edge of a block and the front is denoted by X. Considering the section of the block within the or one of the geologic layers that contain it, the surface invaded by the displacing fluid divided by the total block area at this level is denoted by A which is the normalized invaded area. The relation connecting A and X is denoted by A(X). This function defines physically the progress of the imbibition front within the constituent blocks of the fractured medium. Area A is a normalized area related to the total area of the sections of the blocks contained in the elementary volume (cell) of the fractured reservoir model being studied.

This function A(X) relative to the blocks of the complex porous medium is calculated by an image processing technique applied to the image representative of the real fracture network (complex porous medium) reconstructed at the scale of the elementary units (cells) of the reservoir model being considered.

Various known methods allow determination of function A(X). The method described in French Patent 2,757,957 and its counterpart U.S. Pat. No. 6,064,944 can be used.

The fractures defined by the coordinates of their limit points on a two-dimensional section XY of a layer and the imbibition process through which water is present in the fractures and oil is present in the matrix blocks have to be determined. The invasion of the matrix by water is assumed to be a piston type invasion. It is assumed that function X=f(t), which connects the water front progress to time, is the same for all the matrix blocks, regardless of their shape, and for all the elementary blocks. Function A(X) has no analytical expression and is calculated from a discretization of section XY of the layer being studied according to the algorithm defined below.

Section XY of the layer being studied is considered to be an image in which each pixel represents a surface element. These pixels are evenly spaced out with a pitch dx in direction X and dy in direction Y. The algorithm which is used determines, for each pixel of the image, the minimum distance that separates each pixel from the nearest fracture.

The image is translated by a table of real numbers with two dimensions in which Pict[0:nx+1,0:ny+1], and nx and ny are numbers of the pixels of the image in directions X and Y. In practice, the total number of pixels (nx.ny) is for example on the order of one million. The values of the elements of table Pict are the distances which are sought.

Initialization:

All the pixels through which a fracture passes are at a zero distance from the nearest fracture. For these pixels, the table Pict is thus initialized at value 0. This is performed per se by known algorithm (the Bresline algorithm for example) that is given the coordinates of the pixels corresponding to the two ends of a fracture under consideration as a line segment and that initializes (at 0 in the present case) the nearest pixels. The other elements of Pict are initialized at a value that is greater than the largest distance between two pixels of the image. This value is for example nx.dx+ny.dy.

Calculation:

For a given pixel, the distance to the nearest fracture is calculated from the distance values already calculated for the neighboring pixels. It is assigned a value that, if it is less than the value initially assigned thereto, is the minimum of the values of the neighboring pixels to which the distance from these pixels to the one considered is added.

This calculation is carried out in two successive stages. During the descending pass, the image is scanned line by line, downwards and from left to right (from Pict[1,1] to Pict[nx,ny]). The pixels that are taken into account are different according to whether the pass is descending or ascending.

With the oblique distance dxy defined as: $dxy=\sqrt{dx^2+dy^2}$, the algorithm is written as follows:

```
for j=1 to ny
 | for i=1 to nx
 |  |    Pict[i,j] =  min   Pict[i−1,j] + dx,      : descending pass
 |  |                       Pict[i−1,j−1] + dxy,
 |  |                       Pict[i,j−1] + dy,
 |  |                       Pict[i+1,j−1] + dxy,
 |  |                       Pict[i,j]
 | end of loop on i
 end of loop on j
 for j=ny to 1,
 | for i=1x to 1,
 |  |    Pict[i,j] = min    Pict[i+1,j] + dx,      : descending pass
 |  |                       Pict[i+1,j+1] + dxy,
 |  |                       Pict[i,j+1] + dy,
 |  |                       Pict[i−1,j+1] + dxy,
 |  |                       Pict[i,j]
 | end of loop on i
 end of loop on j
```

Histogram:

From the calculated table Pict, a histogram can be drawn by classifying the non-zero values (those assigned to the pixels outside the fractures) in increasing order.

The accumulated result of this histogram gives, for any distance defining two intervals of the histogram, the number of non-zero pixels whose value is lower than this distance. In the described application to a fractured porous medium where this distance corresponds to the progress of the water front, the cumulative result of the histogram indicates the area which is invaded by water. Curve A(X) is obtained by dividing this cumulative result by the total number of non-zero pixels (in order to normalize it). The number of intervals used on the abscissa of the histogram corresponds to the number of discretization points of curve A(X). It is selected, for example, to be equal to 500.

Determining the Dimensions of the Equivalent Blocks

According to the invention, the equivalent blocks are parallelepipeds of height c (direction perpendicular to the geological layers) and a rectangular section of dimensions a and b. The "vertical" dimension (that is orthogonal to the layers) of the blocks is not required insofar as a capillary continuity is assumed to exist in this direction with the fracture networks having in most cases a sub-orthogonal dip to the layer boundaries. Thus, determining the dimensions of a block determines the width (a) and the length (b) of the rectangle forming the base of the parallelepiped.

The method according to the invention allows determination of the dimensions a and b of an equivalent block from an analysis of the derivative A'(X) of function A(X).

When applied to the original case of the determination of a single equivalent block, this determination method is generalized to the case of N families of equivalent blocks. FIG. 1 illustrates the principle of the method for determining two families of equivalent blocks.

Analytical Method of Determining the Dimensions of an Equivalent Block Family

The function giving the normalized area of the equivalent block of rectangular section, Aeq, depending on the distance to the fracture, X, is written as follows:

$$Aeq(X)=(2/a+2/b)X-4X^2/(ab)$$

The dimensions a and b of an equivalent block are determined by identifying the curve derived from A(X). In fact, on the one hand, for an equivalent block of dimensions a and b, the derivative of the normalized invaded area Aeq with respect to the distance to the fracture X is a line of equation:

$$A'eq(X)=(2/a+2/b)-8X/(ab)$$

On the other hand, for the blocks of the complex porous medium, the derivative A'(X) of the normalized invaded area with respect to X has interesting and useful properties for identification which are the value at origin A'(0) in a two-dimensional situation, which has a slope equal to twice the total length of the fractures per unit of area of fractured medium to be homogenized (because each fracture is common to two blocks and exchanges with each one of them). It can be identified with the initial derivative relative to the equivalent block that is written as follows:

$$A'eq(0)=2/a+2/b=2(a+b)/(ab)$$

The final value A'(Xmax) provides information on the shape anisotropy of the blocks, knowing that it approaches zero when X tends to Xmax, for blocks of similar dimensions in each direction, but it approaches a largest dimension of the blocks if they have a rectangular section. For the blocks of the complex porous medium, of various sizes, the final derivative A'(Xmax) characterizes the shape of the last largest blocks. For the equivalent block, this final slope obtained for a value Xmax of distance X equal to [Min(a,b)]/2 is written as follows:

$$A'eq(X\text{max})=(2/a+2/b)-4[\text{Min}(a,b)]/(ab)$$

Assuming that Min(a,b)=a, the following relationship is obtained:

$$A'eq(a/2)=2/a-2/b$$

The method of identifying the dimensions of the equivalent block then identifies the value at origin and the slope of the derived function A'eq(X) respectively at origin A'(0) and at the estimated mean slope of the real function A'(X).

Origin of Curve A'(X)

The origin derivative, A'(0), is by definition equal to twice the total length of fractures per unit of area to be homogenized, that is double the fracture surface density (m/m²), information that is available at the end of the fracturation analysis. It is also possible to estimate a numerical value of A'(0) by defining function A'(X), which gives for example:

$$A'(0)=0.1/A^{-1}(0.1) \text{ wherein}$$

A, the normalized area, ranges between 0 and 1 and A(0)=0.

Mean Slope of Curve A'(X)

The mean slope, A'moy, is estimated by minimizing the differences between the approximate line that is sought and the real function A'(X).

Determining Dimensions (a,b) of the Equivalent Block

The origin and the slope of the line A'eq(X) relative to the rectangular block (a,b) that is sought are identified with the previous two real values. This results in the following system of equations:

$$A'(0)=2/a+2/b \text{ that is: } (1/a)+(1/b)=A'(0)/2$$

and $$A'\text{moy}=-8/(ab) \text{ that is: } (1/b)\times(1/b)=-A'\text{moy}/8 \text{ wherein}$$

1/a and 1/b are solutions to the equation: $y^2-[A'(0)/2]y-A'\text{moy}/8=0$ which has the following solutions:

$$1/a=[A'(0)/4]+[\text{sqrt}([A'(0)/2]^2-A'\text{moy}/2)]/2$$

$$1/b=[A'(0)/4]-[\text{sqrt}([A'(0)/2]^2-A'\text{moy}/2)]/2$$

Analytical Method of Determining the Dimensions of n Equivalent Block Families

The geological reality is often complex, to such an extent that representing the fracture network by a single equivalent block family is often too approximate to estimate with sufficient precision the matrix/fractures exchanges. What is referred to as family of equivalent blocks is a set of equivalent blocks having sections of equal dimensions a and b.

Thus, according to another embodiment, n (n>1) families of equivalent blocks are determined (not only one are determined).

The starting point is again from the complex porous medium comprising a set of blocks of various dimensions and shapes, which are now to be modelled as a set of n (and no longer one) families j of nj parallelepipedic blocks, whose rectangular base dimensions are aj and bj.

The area Aeq(X) and the derivative A'eq(X) relative to this set of families are expressed. Again it is assumed that aj<bj and the families (nj,aj,bj) are classified in such a way that a1<a2<...<an.

$$Aeq(X) = \frac{\sum_{j,aj<=2X} njajbj + \sum_{j,aj>2X}^{n} nj[ajbj-(aj-2X)(bj-2X)]}{\sum_{j=1}^{n} njajbj}$$

$$Aeq(X) = \frac{\sum_{j,aj<=2X} njajbj + \sum_{j,aj>2X}^{n} (njajbj)[2X/aj+2X/bj-4X^2/(ajbj)]}{\sum_{j=1}^{n} njajbj}$$

$$Aeq(X) = \sum_{j,aj<=2X} vj + \sum_{j,aj>2X}^{n} vj[2X/aj+2X/bj-4X^2/(ajbj)]$$

with vj=surface fraction of the family (nj,aj,bj) of nj blocks of dimensions aj and bj.

$$A'eq(X) = \sum_{j,aj>2X}^{n} vj[2/aj+2/bj-8X/(ajbj)]$$

$$A'eq(X) = \sum_{j,aj>2X}^{n} vj[2/aj+2/bj] - 8\left[\sum_{j,aj>2X}^{n} vj/(ajbj)\right]X$$

A'eq(X) remains a linear function at X with segments j of decreasing slope A"j whose end X=aj/2 corresponds to the completion of the invasion of a given family of blocks j. Furthermore, if aj is always less than bj, a discontinuity of this derivative, equal to vj(2/aj-2/bj), is observed for X=aj/2.

The slope of each line segment j corresponding to the invasion of the (n-j+1) families of larger blocks is:

$$A''j = -8\left[\sum_{i=j}^{i=n} vi/(aibi)\right]$$

It can in particular be noted that:

$$A'eq(0) = \sum_{j=1}^{n} vj[2/aj + 2/bj]$$

$$A'eq(X\max = an/2) = vn[2/an - 2/bn]$$

By means of a piecewise linear regression of the real derivative A'(X), n equivalent block families are identified with each equivalent block family j being represented by a segment [aj−1,aj] having a given slope A"j.

With minimum dimensions aj of the various equivalent blocks being known, determination of these n block families is continued by solving the following system with (2n) unknowns vi and bi:

$$-8\left[\sum_{i=j}^{n} vi/(aibi)\right] = A''j, \quad j = 1 \text{ to } n$$

$$vj[2/aj - 2/bj] = \square A'j, \quad j = 1 \text{ to } n$$

Wherein A"j is the slope of curve A'(X) approximated by a line segment in interval [aj−1,aj], and δA'j is the jump of the derivative at X=ai/2 (discontinuity of A'(X) identified with n segments).

Analytical Method of Determining the Dimensions of 2 Equivalent Block Families

According to a particular embodiment of the method described above, only two (n=2) equivalent block families of dimensions (a1,b1) and (a2,b2), with surface proportions v1 and (1−v1), are identified, considering that this selection of two equivalent block families is a good practical compromise for the representation of fractures. It can in fact be shown that two equivalent block families approximate the process of block invasion by a fluid much better than a single set of equivalent blocks. In this particular case n=2 appears to be a sufficient progress in practice.

FIG. 1 illustrates the principle of the method of determining two equivalent block families. It represents the real derivative A'(X) as a function of distance X as a dotted curve, and the equivalent derivative Aeq'(X), continuous curve having two line segments.

Identifying two block families (v1,a1,b1) and (v2,a2,b2) adjusts to the real derived curve A'(X) a derived curve A'eq(X) comprising two segments of distinct slope which are continuous if the small blocks are substantially of square section (a1#b1) and which are discontinuous if small blocks are substantially rectangular (FIG. 1). Still assuming that a1<a2, a1<b1 and a2<b2, the method described hereafter comprises two identification stages.

Determining a1

The value of the dimensional is sought that minimizes the sum of the mean square deviations between two line segments defined in intervals [0,a1/2] and [a1/2,Xmax] and the real derived curve A'(X). It should be noted that these two segments are not necessarily continuous:

If the value of a1 is such that A(Xmax)−A(a1/2) or A(a1/2) is negligible compared with A(Xmax)=1 (less than 0.1 or 0.05) for example, taking two block families into consideration is not really useful and determination of a single equivalent block is sufficient;

If this is not the case, identification of the two families of equivalent blocks (a1,b1) and (a2,b2) is continued.

Determining the Values of v1, b1, a2 and b2

The formula of A'eq(X) is expressed in the particular case of two block families. There are two line segments possibly having a discontinuity at X=a1/2:

$$A'eq(X)=[v1(2/a1+2/b1)+v2(2/a2+2/b2)]-8[v1/(a1b1)+v2/(a2b2)]X \text{ if } 0<X<a1/2$$

$$A'eq(X)=[v2(2/a2+2/b2)]-8[v2/(a2b2)]X \text{ if } a1/2<X<a2/2$$

The linear regression described above allows determination of the slopes (A"1,A"2) and ordinates at origin (Bo1, Bo2) of the two line segments defined in the respective intervals [0;a1/2] and [a1/2;a2/2]:

$$A''1=-8[v1/(a1b1)+v2/(a2b2)]$$

$$A''2=-8[v2/(a2b2)]$$

$$Bo1=[v1(2/a1+2/b1)+v2(2/a2+2/b2)]$$

$$Bo2=[v2(2/a2+2/b2)]$$

By subtracting the slopes of the two line segments, the following equation is obtained:

$$A''1-A''2=-8v1/(a1b1) \quad (1)$$

On the other hand, at X=a1/2, the ordinate difference δA'1 between the two line segments is:

$$\delta A'1=v1(2/a1-2/b1) \quad (2)$$

It is deduced from Equation (1) that:

$$-v1/b1=a1(A''1-A''2)/8$$

and by replacing the expression of v1/b1 in Equation (2), the value of v1 is deduced:

$$2v1/a1=\delta A'1+2v1/b1$$

or:

$$2v1/a1=\delta A'1+a1(A''2-A''1)/4$$

hence:

$$v1=a1[\delta A'1+a1(A''2-A''1)/4]/2$$

Then b1 is deduced:

$$b1=8v1/[a1(A''2-A''1)]$$

and $$v2=1-v1$$

(1/a2) and (1/b2) can then be determined as the solutions to the second-degree polynomial formed from the expressions of the slope (A"2) and of the ordinate at origin (Bo2) of the adjusted $2^{nd}$ line segment. In fact:

$$(1/a2)\cdot(1/b2)=-A''2/(8v2)$$

$$1/a2+1/b2=Bo2/(2v2)$$

which leads to the following polynomial having 1/a2 and 1/b2 as the solutions:

$$y^2-[Bo2/(2v2)]y-A''2/(8v2)=0$$

3—Simulation of the Fluid Flows

At this stage, the reservoir engineer has a simplified representation of the fractured hydrocarbon reservoir from which hydrocarbons are to be extracted. This representation is equivalent to a complex representation in terms of recovery estimation.

The reservoir engineer then selects a production method, for example the waterflooding recovery method, for which the optimum implementation scenario for the field being considered remains to be specified. Defining an optimum waterflooding scenario for example fixes the number and the location (position and spacing) of the injector and producer wells in order to best take account for the impact of the fractures on the progress of the fluids within the reservoir.

According to the selected scenario and to the representation of the reservoir by equivalent blocks, it is then possible to simulate the expected hydrocarbon production by a known tool which is a double-medium flow simulator. By exporting the dimensions of the equivalent block families to such a simulator, the fluid flows within the reservoir are simulated.

4—Optimization of the Reservoir Production Conditions

By selecting various scenarios characterized for example by various respective locations of the injector and producer wells, and by simulating hydrocarbon production for each one according to stage 3, it is possible to select the scenario allowing optimization of the reservoir production according to selected technicoeconomic criteria.

Example of Application

The realistic fracture network of FIG. 2 has two families having the following statistical properties:

family 1 are fractures of mean length equal to 60 m with a mean spacing 5 m, and family 2 are fractures of mean length equal to 60 m with a mean spacing 7 m which is oriented 90° to the fractures of family 1.

Figure 3:
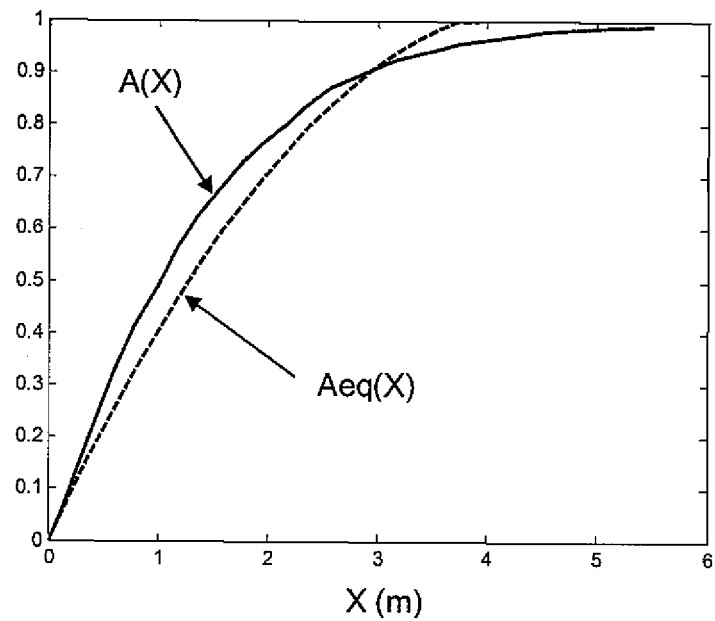
Figure 4:
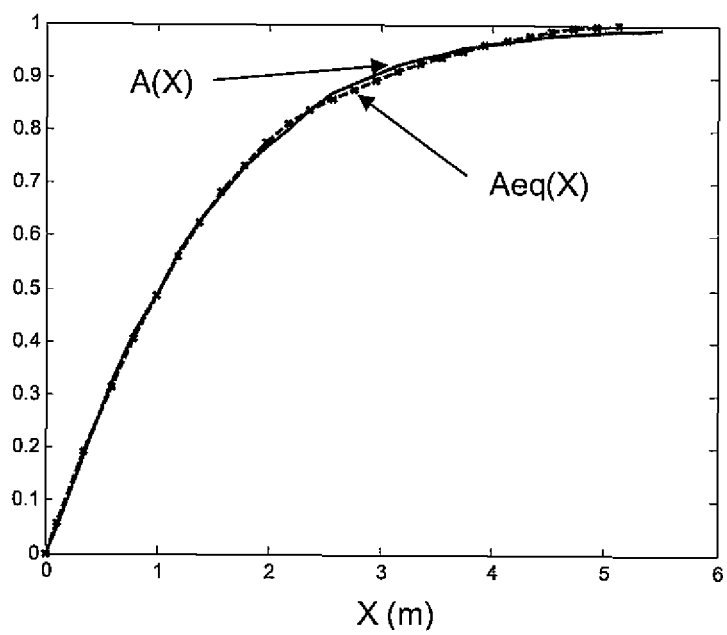
FIG. 4 compares, for the network image of FIG. 2, function Aeq(X) relative to two families of equivalent blocks with the real function A(X).

The method of identifying one, then two equivalent block families based on the use of the derivative of function $A(X)$ is applied to a horizontal section representative of the realistic network studied. The results obtained are as follows:

identification of a block with dimensions of the equivalent block are a=7.52 m and b=10.65 m; FIG. 3 compares function $Aeq(X)$ relative to this equivalent block family (dotted curve) with real function $A(X)$ (continuous curve);

identification of two equivalent block families with a first set of equivalent blocks of dimensions a1=4.72 m and b1=4.92 m, representing 49% of the total area of the blocks, and a second set of blocks of dimensions a2=10.55 m and b2=11.25 m occupying the complementary area. FIG. 4 compares function $Aeq(X)$ relative to these two equivalent block families (dotted curve) with real function $A(X)$ (continuous curve).

The comparison of the previous two figures clearly shows that two families of equivalent blocks restore the real distribution of the fractures much better than only one. Furthermore, the residual error is then entirely negligible. Identification of more than two equivalent block families is therefore not necessary.

Advantages

The invention allows prediction of the hydrodynamic behavior (flow rate, pressure, . . . ) in response to exterior stresses imposed via wells upon hydrocarbon production.

Engineers in charge of reservoir development therefore have a tool allowing them to rapidly evaluate the performance of various production scenarios and thus to select the one for optimizing the development considering the criteria selected by the operator to ensure optimum hydrocarbon production.

The invention thus finds an industrial application in the development of underground reservoirs comprising a network of fractures. It can be a hydrocarbon reservoir whose production is to be optimized, or a gas storage reservoir for example, for which injection or storage conditions are to be optimized.

The invention claimed is:

1. A method for optimizing development of a fluid reservoir traversed by a network of fractures, from modelling of the reservoir as a porous medium comprising a set of blocks of irregular shapes and sizes defined by fractures, wherein a simplified representation of the medium is determined as a set of equivalent blocks of regular shapes and sizes with the simplified representation substantially providing fluid recovery identical to the modelling of the reservoir with a set of blocks of irregular shapes and sizes during a capillary imbibition process of the porous medium, comprising:

determining a first curve representing a derivative ($A'(X)$) of a function ($A(X)$) defining a progress of an imbibition front within the set of blocks of irregular shapes and sizes of the porous medium with respect to a distance of progress (X) of the front;

determining a second curve representing a derivative ($A'eq(X)$), with respect to the distance of progress (X), of a function ($Aeq(X)$) defining progress of an imbibition front within the set of equivalent blocks of regular shapes and sizes of the simplified representation, the second curve including at least two line segments with slopes and depending on dimensions of the equivalent blocks, by determining slopes of the at least two line segments and an ordinate at an origin of one of the segments;

obtaining dimensions of the equivalent blocks by adjusting the second curve ($A'eq(X)$) to the first curve ($A'(X)$); and optimizing the development of the reservoir by using a computer to simulate fluid flows in the reservoir with a double-medium reservoir simulator using the dimensions of the sets of equivalent blocks.

2. The method as claimed in claim 1, wherein two families of parallelepipedic equivalent blocks are identified with the dimensions comprising dimensions a1 and b1 of a base of the blocks of a first family, dimensions a2 and b2 of a base of the blocks of a second family, surface proportions of the blocks of the two families, and the dimensions of the equivalent blocks of the two families are determined by:

evaluating a1 by minimizing a sum of mean square deviations between the first and second curves;

calculating an ordinate difference between the at least two line segments for an abscissa equal to a1/2;

determining slopes of the at least two line segments in intervals [0; a1/2] and [a1/2; a2/2] and an ordinate at an origin of one of the segments; and determining dimensions b1, a2 and b2, and surface proportions from the ordinate difference, the slopes and the ordinate at the origin.

* * * * *